April 12, 1932.   J. A. DIENNER   1,854,155
LIQUID LEVEL INDICATOR
Filed July 30, 1921   2 Sheets-Sheet 1
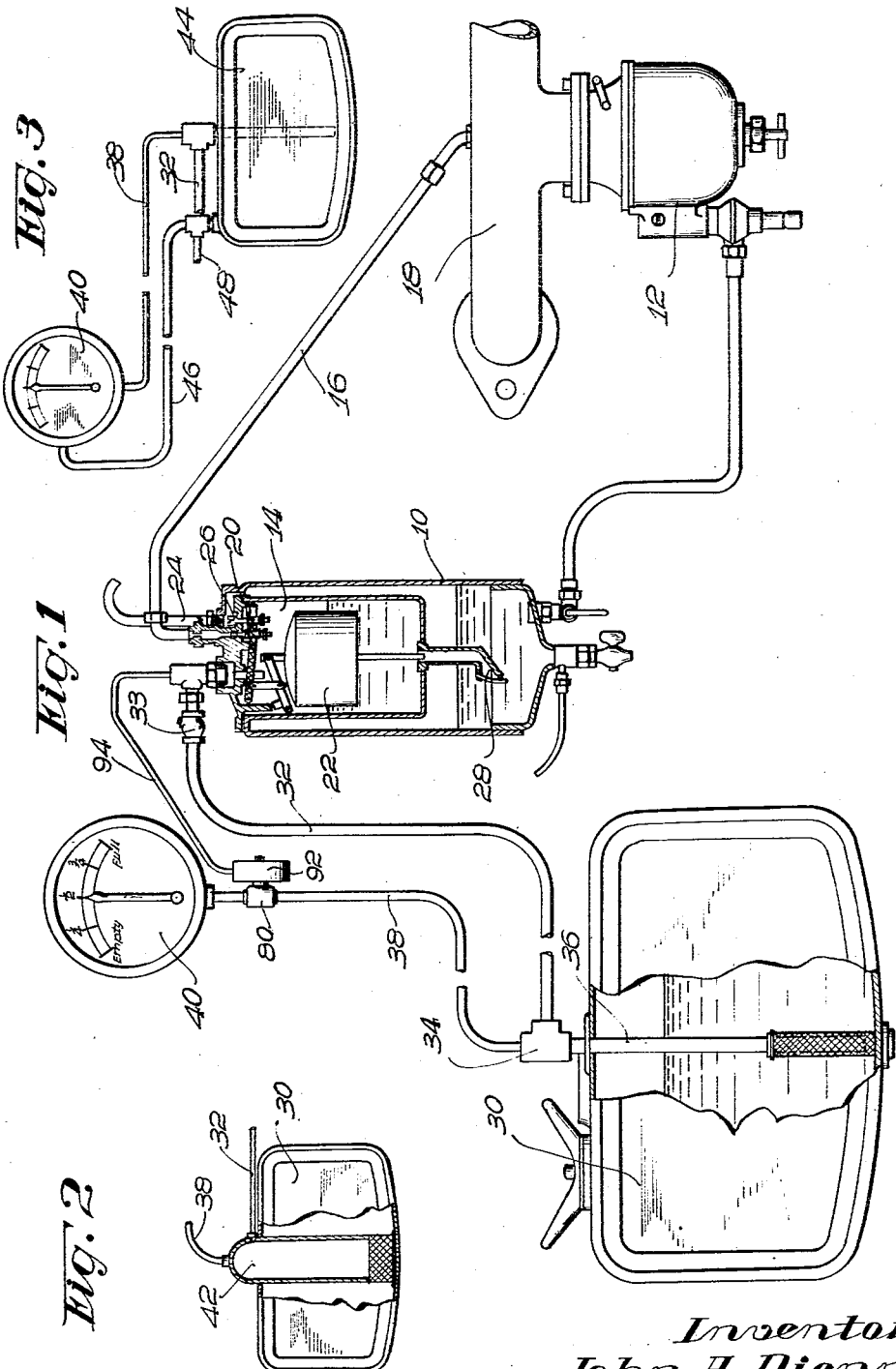

April 12, 1932.  J. A. DIENNER  1,854,155
LIQUID LEVEL INDICATOR
Filed July 30, 1921   2 Sheets-Sheet 2
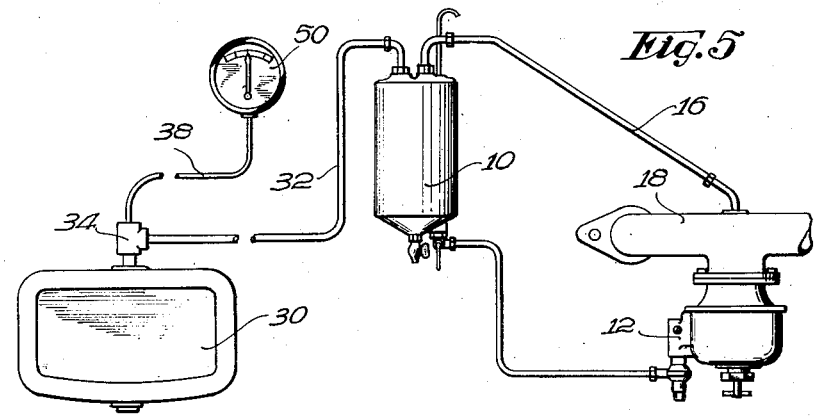
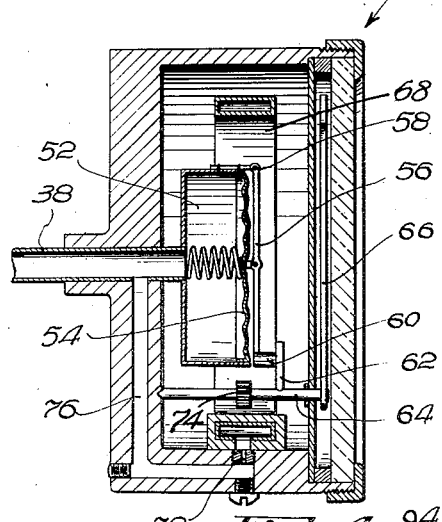
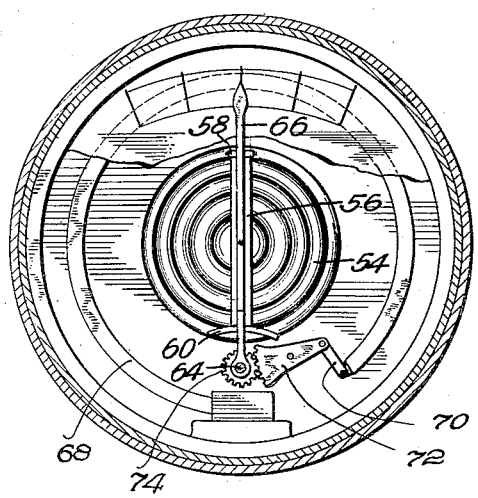
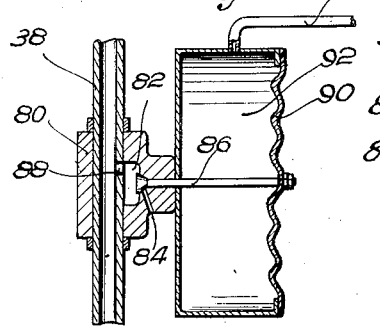
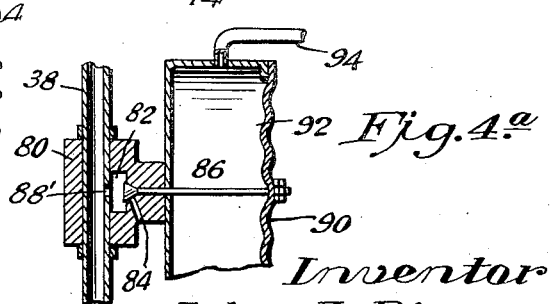
Inventor
John A. Dienner
By Attorneys Patented Apr. 12, 1932

1,854,155

UNITED STATES PATENT OFFICE

JOHN A. DIENNER, OF CHICAGO, ILLINOIS, ASSIGNOR TO STROMBERG MOTOR DEVICES CO., OF CHICAGO, ILLINOIS, A CORPORATION OF ILLINOIS

LIQUID LEVEL INDICATOR

Application filed July 30, 1921. Serial No. 488,741.

My invention relates to indicating means, which, while obviously capable of general application, is particularly useful for indicating the level of a liquid in a container at a distance from said container, for instance, indicating on the dashboard of a motor vehicle the condition of a fuel tank remote from said dashboard. A large proportion of the numerous unsuccessful attempts along this line, which have been made in the past, have failed on account of the intricacy and expensiveness of the apparatus involved, and also on account of its lack of reliability and durability.

One object of my invention is to provide indicating means comprising a minimum number of parts, and operating in a very simple and practically infallible way.

Another object is to provide such a system which, while primarily designed for installation on motor vehicles in the factory, may also be readily applied at a very slight expenditure of time and labor to motor vehicles at present in use.

Another object is to provide a system which will operate in an entirely satisfactory manner in connection with pressure feed, gravity feed, or suction feed fuel supply systems.

Another object is to provide a system which will indicate the operation of an intermittent suction feed supply device, as well as the condition of the fuel tank.

Many other objects and advantages of my invention will become apparent as the description proceeds.

In the accompanying drawings:

Figure 1 is a partly sectional view of a well-known suction tank fuel supply device, illustrating the application of apparatus according to my invention thereto.

Figure 2 is a view of a modified form of fuel tank, and Figure 3 is a more or less diagrammatic illustration of the application of apparatus according to my invention to a pressure feed system.

Figure 4 is a detailed section of a bleeder.

Figure 4A is a fragmentary detailed section of another form of bleeder.

Figure 5 is a view of a system designed to operate without a check valve.

Figure 6 is a central section through the indicator employed in Figure 5, and

Figure 7 is a front view of the same partly broken away to show the interior mechanism.

In the embodiment of my invention illustrated in Figure 1, my improved indicating means is shown associated with a well known type of vacuum feed system comprising the usual gravity tank 10 from which fuel is delivered to the carbureter 12, which tank encloses the vacuum chamber 14. A connection 16 connects the vacuum chamber with the intake manifold 18 subject to the control of a valve 20 actuated by the float 22. Gravity tank 10 is in constant communication with an air vent 24 and a valve 26 which is also actuated by the float 22 to establish communication between the suction chamber 14 and the air vent 24. The check valve 28 prevents the fuel from flowing back from the supply tank 10 to the vacuum tank 14.

In the usual operation of this device, the float disconnects chamber 14 from atmosphere and connects it to the intake manifold whenever the fuel level falls below a predetermined point. Fuel is thereupon drawn by the suction generated in the manifold from the tank 30 through pipe 32 to fill chamber 14. When the level in chamber 14 rises beyond a predetermined point the chamber will be disconnected from the manifold and connected to atmosphere to permit the fuel therein to flow out through check valve 28 into chamber 10. When this occurs the contents of tube 32 are held in place by check valve 33.

My improved indicating apparatus comprises essentially a pressure sensitive element subjected on one side to the same pressure as that of the surface of the fuel in the tank 30, and means for communicating to the other side of said element the pressure existing at some fixed point in the delivery system. As the level of the fuel in the tank changes, the difference in hydrostatic pressure between the pressure existing at the fixed point to which one side of the pressure sensitive element is connected and the pressure existing at the surface of the fuel in the tank, will change, producing a corresponding change in the position of the sensitive element, which element may obviously be calibrated to read directly the quantity of fuel in the tank, if desired.

In connecting apparatus substantially as above described to the vacuum feed system illustrated in Figure 1, one side of the pressure sensitive element need merely be exposed to atmosphere, as this will be the pressure existing at the surface of the fuel in the tank.

While the other side of the pressure sensitive element may obviously be connected to any point in tube 32 on the fuel tank side of check valve 33, it is preferable to connect the indicator directly above the center of the fuel tank, in which case forward and rearward inclination of the car in climbing or descending hills will not appreciably affect the vertical distance between the point at which the pressure is measured, and the level of the fuel in the tank. At the same time, by making the movement of the indicator pointer, or other indicating means, for a given variation in fuel level a function of the relation of the pressure existing at some fixed point in the system to the pressure at the surface of the fuel, or some other relatively fixed value, the relation of the movement of the indicating pointer for a given change in level to the total amount of movement permitted in the pointer will be greater than where the movement of the pointer is merely a direct function of the variation at some fixed point in the system. The increments of indication for the changes in pressure may, therefore, be greater, and these increments being greater or larger in proportion to the complete movement of the pointer, smaller pressure differences and, therefore, smaller level variations may be more accurately measured and more closely indicated. I have illustrated a T 34 forming the connection between tube 32 and the riser 36 which enters the tank 30 to withdraw the fuel therefrom. From T 34 a tube 38 leads to the pressure sensitive indicating device 40.

From the foregoing the extreme simplicity of my method and the apparatus involved will be apparent. It is only necessary to calibrate the scale of the indicator 40 in terms of the amount of fuel in the tank and the result is complete.

If it is desired to have the indicator 40 undisturbed by the intermittent suction action of the fuel feed system, the dynamic differences in pressure generated by a flow through the system should also be substantially eliminated. This can be easily accomplished by making the diameter of the internal passages in T 34 substantially greater than the diameter of the riser 36 and tube 32, or where the system is embodied in the cars in process of manufacture a dome 42 may be substituted for the riser 36, tube 38 being connected to the highest point in the dome, and tube 32 to a somewhat lower point. The enlarged T 34 would act in the manner of a liquid trap or liquid bell, and by trapping liquid therein could be used to prevent a full surge back through the pipe 36 for each impulse from the vacuum tank. A liquid piston could, in this manner, be maintained in the pipe 36 and this would eliminate disturbances to the indicator with each impulse of the vacuum tank.

It will be obvious that the difference in hydrostatic pressure between the pressure existing at the surface of the fuel in the tank and the pressure existing at a predetermined point in the delivery line, is entirely independent of the means employed to force the fuel through the delivery line, and that indicating means according to my invention can therefore be readily applied to any known type of fuel feed system. In applying such an indicator to a pressure feed system having a sealed tank 44 (see Figure 3), to which air under pressure is delivered by pipe 48, it is only necessary to seal the casing enclosing the pressure sensitive element, and connect it by a tube 46 to the top of tank 44 to establish equality of pressure between the outside of the pressure sensitive element and the surface of the fuel in the tank.

In Figures 5, 6, and 7 I have illustrated indicating means adapted to be associated with a suction line containing no check valve. Upon reference to Figure 5 it will be observed that check valve 33 has been omitted from pipe 32. Pipe 38 communicates with a specially designed indicator 50 arranged to indicate the suction at the point of connection with the supply line during suction period, and to maintain the indication thus obtained during the intervals between successive suction periods.

At the beginning of a suction period the decrease in pressure is communicated directly through the relatively free passageway 38 to an enclosure 52 covered by a resilient cover 54 which gives in and withdraws the lever 56 pivoted at 58 so as to move shoe 60 out of contact with pin 62 carried on the pivot 64 to which the indicator pointer 66 is attached. This surrenders the needle to the control of the Bourdon element 68 connected thereto by means of the usual link 70, pivoted segment 72 and pinion 74. The Bourdon element 68 is also subjected to the vacuum existing at the point of connection through passageway 76 which communicates therewith through constricted orifice 78. The constriction of this orifice serves a twofold purpose. When the suction period ceases shoe 60 will move back into contact with pin 62 and lock the needle in position before any appreciable change in the pressure in the Bourdon element 68 has taken place. This results in maintaining a correct indication of the condition of the container 30 at all times. At the beginning of the suction period the high vacuum in manifold 18 will pass through tube 16 and 32 and up tube 38 to act on the resilient element 54, which element, however, is amply strong to withstand any suction to which it may be subjected. This suction, however, is many times that due to the hydrostatic pressure caused by a difference in level between the fuel in the tank and the point of connection, and if it were communicated to the Bourdon element 68, it would tend to throw the needle violently off the scale. The restricted orifice 78 prevents this by delaying the equalization of pressure between the interior of the Bourdon element and passageway 76 until pipe 32 has filled with liquid, and the rate of flow through the system is such that the pressure in the T 34 is substantially that due only to the difference in level between the T and the surface of the fuel in the tank plus the loss in head due to the friction of flow.

When pipe 38 contains any downwardly directed bends between T 34 and indicator 40, it is not impossible that a distillate from the fuel employed, or a slug resulting from the jarring of the vehicle in case the shapes of the passages in T 34 are not well designed, might partially or wholly fill such a bend with a body of liquid, the two surfaces of which body would presumably not lie at the same level, which would disturb the action of the indicator. Wherever the installation is such that any liquid can accumulate in pipe 38, I prefer to provide for supplying air to the pipe 38 as, for example, by means illustrated in detail in Figure 4 and shown as applied to the system of Figure 1, although it could obviously be applied to the system shown in Figure 5.

A sleeve 80 is mounted on tube 38 just below the indicator 40, and has an interior chamber 82, communicating with the atmosphere through a passage 84 controlled by valve 86 and with the interior of tube 38 through an orifice 88. A pressure sensitive element 90 forming the cover of the container 92 is subjected to suction at the discharge end of tube 32 by means of a connecting tube 94. It will be obvious that during the suction period valve 86 will be opened to permit air to enter tube 38, and that the passages 84 and 88 may obviously be made so small that the leakage thus permitted has no effect whatever on the pressure in tube 38, so that the reading of the instrument is not changed. While I have illustrated the valve 86 arranged to permit a continued slight leakage during suction period it will be obvious that by positioning orifice 88' in line with the valve as shown in Figure 4A, the passageways can be made larger and a small slug of air will be admitted to tube 38 at the beginning of a suction period during the movement of valve 86 from the position shown to a position covering the orifice 88.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A method of indicating at a remote point the quantity of fuel in a fuel tank, having a fuel delivery pipe, by means of a fluid pressure responsive indicator which method comprises, creating a difference between the pressure imposed upon the surface of the fuel in the tank, and the pressure prevailing at the end of the fuel delivery pipe, measuring the difference between the pressure at a fixed point in said delivery pipe and the pressure prevailing upon the surface of said fuel in the tank, and periodically introducing air into the connection between the fixed point in the delivery pipe and the pressure responsive indicator.

2. In combination, a main tank, a delivery pipe, means for withdrawing liquid from the main tank through the delivery pipe, a pressure sensitive indicator connected to said delivery pipe at a fixed point above the maximum level of liquid in the main tank thereof and subject to the difference in pressure between the pressure prevailing upon the surface of liquid in the main tank, and the pressure prevailing at said fixed point in the delivery pipe, and means forming a chamber at said fixed point and operable to prevent fluctuations of said indicator.

3. In combination, a supply reservoir, a conduit leading upwardly from a point below the level of liquid in said reservoir and having a pair of branches, means adjacent the free end of one branch for withdrawing liquid from said reservoir, and means adjacent the free end of the other branch for indicating the pressure at the point of junction of the branches, independently of any liquid connection between the point of junction of the branches and the pressure indicating means, said indicating means being calibrated in terms of the amount of liquid in the reservoir, and the point of junction being enlarged to render the velocity head negligible.

4. In combination, a supply reservoir, a conduit leading upwardly from a point below the level of liquid in said reservoir and having a pair of branches, means adjacent the free end of one branch for withdrawing liquid from said reservoir, and means adjacent the free end of the other branch for indicating the pressure at the point of junction, independently of any liquid connection between the point of junction of the branches and the pressure indicating means, said conduit being enlarged at the point of junction to render the velocity head negligible.

5. In combination, a supply reservoir, a withdrawal conduit leading from a point below the liquid level in said reservoir to a point thereabove, said conduit having a portion so dimensioned that the velocity head due to liquid flow therethrough is negligible, a pressure sensitive element for indicating the difference between two pressures, a connection for communicating one pressure to said element, independently of any liquid connection therebetween from said point in said conduit where the velocity head is negligible, and means for subjecting said element to another pressure equal to that at the surface of the liquid 6. In combination, a supply reservoir, a withdrawal conduit leading from a point below the liquid level in said reservoir to a point thereabove, said conduit having means providing a chamber so dimensioned that the velocity head due to the liquid flow therethrough is negligible, a pressure sensitive element for indicating the difference between two pressures, a connection for communicating one pressure to said element independently of any liquid connection therebetween from said point in said conduit where the velocity head is negligible, means for subjecting said element to another pressure equal to that at the surface of the liquid, indicating means calibrated in terms of the amount of liquid in said reservoir, and means operatively connecting said indicating means and said pressure sensitive element.

7. In combination, a main supply tank, a vacuum tank above the level of the liquid in the main tank, a conduit connecting the vacuum tank and the bottom of the main tank, a pressure sensitive indicator for indicating the contents of the main tank and connected to said conduit above the maximum level of liquid in said main tank, and a check valve in said conduit between said vacuum tank and said connection with the indicator for preventing back flow in said conduit.

8. In a motor vehicle the combination of an internal combustion engine having an intake, a main fuel tank, an intermittently acting suction tank having connection with the source of suction operated by the engine, a fuel feed line extending from the main tank to the suction tank, a pneumatically operated indicator having an upwardly extending connection connected to said feed line at a fixed point therein above the maximum level of liquid in the fuel tank, said indicator being graduated in terms of the fuel contents of said main tank, and being operable between periods of suction of the suction tank to indicate the fuel contents of the main tank, and means for closing off the upper end of the fuel delivery pipe above said fixed point while no fuel is discharged therethrough.

9. In a motor vehicle the combination of an internal combustion engine having an intake, a main fuel tank, an intermittently acting suction tank having connection with the source of suction operated by the engine, a fuel feed line extending from the main tank to the suction tank, a pneumatically operated indicator having an upwardly extending connection connected to said feed line at a fixed point therein above the maximum level of liquid in the fuel tank, the connection between the indicator and said fixed point in the line containing a body of air, and means for recharging said connection with air, said indicator being graduated in terms of the fuel contents of said main tank and being operable between periods of suction of the suction tank to indicate the fuel contents of the main tank, and means for closing off the upper end of the fuel delivery pipe above said fixed point while no fuel is discharged therethrough.

10. In combination, an automatic suction operated feed tank, a main fuel tank, a suction line between said tanks, said suction line forming a passageway through which fuel may be drawn from the main tank to the feed tank, a fluid pressure operated fuel indicator, and means connecting said indicator to said suction line at a point above the main tank whereby said indicator employs a part of said suction line in common with said suction operated feed tank to substantially the height of the liquid to be measured.

11. In combination, an automatic suction operated feed tank, a main fuel tank, a fluid pressure operated fuel indicator for the main tank, said suction tank and said indicator being connected together, a single conduit employed both by the indicator and by the suction tank and extending to the bottom of the main tank, conduit means including a fuel delivery pipe leading from said single conduit to the suction feed tank and a pipe leading from said single conduit to the indicator, and means for closing off the upper end of the fuel delivery pipe while no fuel is discharged therethrough.

12. A liquid storage tank having a duct leading from a point near the bottom of the tank upward to the top thereof, a suction pipe communicating with the upper end portion of the duct for withdrawing liquid from the tank through the duct, there being a chamber formed in the upper end of the duct above the opening of the suction pipe, a gauge tube containing a column of gaseous medium and communicating with the chamber above the opening of the liquid withdrawing pipe and being subject to the suction thereof, and a pressure controlled vacuum gauge associated with the gauge tube and adapted to be actuated by the varying pressure of the gaseous medium therein.

13. In combination, in a fuel supply and indicating system for an internal combustion engine, a liquid fuel supply tank, a pipe having a passage way of relatively large size extending to the lower part of the tank, a fluid pressure actuated indicator, a tube connecting the said indicator with said passageway, automatic fuel withdrawing means for withdrawing fuel from said tank for the demand of said engine, said fuel withdrawing means having a relatively restricted suction connection opening into the passageway and establishing a fixed datum level for liquid in said passageway with respect to which the indicator is calibrated to indicate the variable level of liquid in the tank, and automatically operating means for preventing the entry of air into said passageway through said connection.

14. In combination, in a fuel supply and indicating system for internal combustion engines, a main liquid supply tank, a vacuum tank connection, a pipe for delivering liquid from the liquid supply tank to said connection, said connection including means for preventing back flow of air therethrough to the liquid delivery pipe, and a fluid pressure responsive indicator graduated in terms of the liquid content of the supply tank and connected to said delivery pipe at a point above the level of the liquid in said tank.

15. In combination, in a fuel supply and indicating system for internal combustion engines, a main liquid supply tank, a vacuum tank connection, a pipe for delivering liquid from the liquid supply tank to said connection, said connection including means for preventing back flow of air therethrough to the liquid delivery pipe, a fluid pressure responsive indicator graduated in terms of liquid content of the liquid supply tank and means connecting said indicator to said delivery pipe at a point above the level of the liquid in said tank, said indicator connection having means whereby the air supply therein may be replenished.

16. In combination, a fuel supply and indicating system for an internal combustion engine, a liquid fuel supply tank, a gas chamber having a passageway of relatively large size extending to the lower part of the tank, a fluid pressure actuated indicator, a tube connecting the said indicator with said chamber, automatic fuel withdrawing means for withdrawing fuel from said tank for the demand of said engine, said fuel withdrawing means having a relatively restricted suction connection opening into the chamber and establishing a fixed datum level for liquid in said chamber with respect to which the indicator is calibrated to indicate the variable level of liquid in the tank, and automatically operating means for preventing the entry of air into said chamber through said connection.

17. A liquid storage tank having a duct leading from a point near the bottom of the tank upward to the top thereof, a suction pipe communicating with the upper end portion of the duct for withdrawing liquid from the tank through the duct, a gauge tube communicating with the upper end portion of the duct and containing a column of gaseous medium which is subjected to the pressure of the liquid in the duct withdrawing pipe, a pressure controlled vacuum gauge associated with the gauge tube and adapted to be actuated by the varying pressure of the gaseous medium therein and automatically operating means for preventing the entry of air into said duct through said suction pipe, and means for creating suction in the suction pipe.

18. In combination, a main liquid supply tank, a vacuum tank thereabove, a pipe for delivering liquid from the first-named tank to the second tank, an automatic valve in that portion of the pipe above the main tank for preventing back flow in the pipe, and a fluid pressure responsive indicator graduated in terms of the liquid contents of the main tank and connected to said delivery pipe at a point on the main tank side of said valve, but above the level of the liquid in said tank.

In witness whereof, I hereunto subscribe my name this 27th day of July, 1921.

JOHN A. DIENNER.

CERTIFICATE OF CORRECTION.

Patent No. 1,854,155.  April 12, 1932.

JOHN A. DIENNER.

It is hereby certified that the name of the assignee in the above numbered patent was erroneously described and specified as "Stromberg Motor Devices Co.", whereas said name should have been described and specified as Bendix Stromberg Carburetor Company, as shown by the records of assignments in this office; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.